No. 809,009.  
PATENTED JAN. 2, 1906.

F. W. PARSONS.  
COLLAR.  
APPLICATION FILED MAR. 6, 1905.

WITNESSES:

INVENTOR.  
Frederick William Parsons  
BY H. J. Fisher.  
ATTORNEY.

UNITED STATES PATENT OFFICE.

FREDERICK WILLIAM PARSONS, OF CLEVELAND, OHIO.

COLLAR.

No. 809,009. Specification of Letters Patent. Patented Jan. 2, 1906.

Application filed March 6, 1905. Serial No. 248,418.

*To all whom it may concern:*

Be it known that I, FREDERICK WILLIAM PARSONS, a citizen of the United States, residing at Cleveland, in the county of Cuyahoga and State of Ohio, have invented certain new and useful Improvements in Collars; and I do declare that the following is a full, clear, and exact description of the invention, which will enable others skilled in the art to which it appertains to make and use the same.

My invention relates to improvements in collars; and the invention consists in a so-called "shirt-collar" of the lay-down or turn-down variety which is so constructed as to make it easy and convenient to engage the collar upon the button at the back of the neck and to disengage the same therefrom, all substantially as shown and described, and particularly pointed out in the claim.

Figure 1:
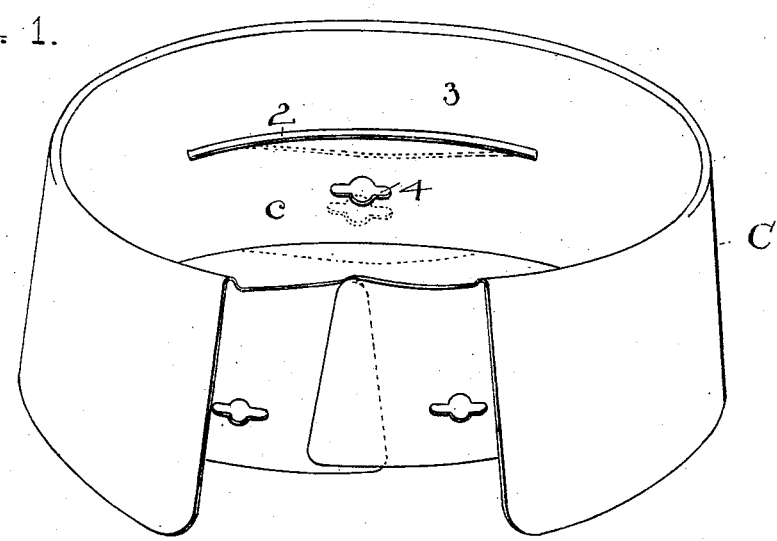
Figure 2:
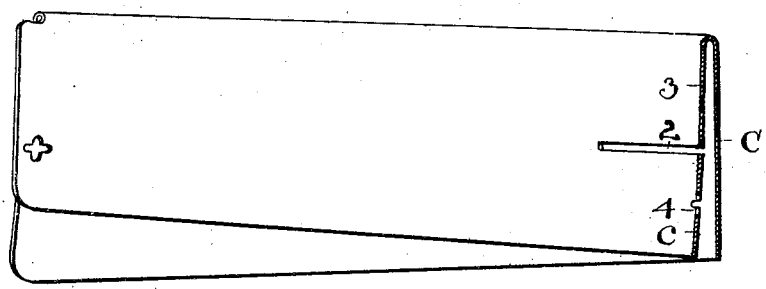

In the accompanying drawings, Figure 1 is a perspective view of a collar embodying my invention in one form, and Fig. 2 is a cross-section thereof centrally front to rear.

Probably the most common and considerable objection to a lay-down collar by those who prefer such collars over standing collars is the difficulty of securing them upon the button at the back of the neck. This objection arises from the fact that the collar is stiff, and being circular in form the outer portion so completely overlaps the buttonhole in the collar-band that it requires the most tedious and trying effort generally to effect engagement of the collar with the button. For this reason the collar has to be opened generally its full length and held open more or less, so as to get at the buttonhole and make engagement when it is turned down again and brought about the neck to button at the front in the usual way. The only exception to this common and universal construction of lay-down collar with which I am familiar and which has been resorted to for the purpose of overcoming or remedying the foregoing objections is the style which has a recess cut in the outer portion over and about the buttonhole, so as to expose said hole and make it available to the fingers while the collar remains down; but this is objectionable in collars both for reasons of manufacture and laundering and is seriously objected to by the wearer, because it shows or is apt to show above the collar of his coat. Now I have avoided all objections of manufacture and doing up and of wearing by providing the collar C with a buttonhole-strip formed directly in the collar-band, as at *c*. Thus in Figs. 1 and 2 the collar is shown as having a slit or slot 2 formed therein lengthwise about midway the depth of the collar-band 3 and extending equal distances oppositely from over buttonhole 4, thus forming a buttonhole-strip in the collar itself and severing the strip from the band along its inner edge. The slit or slot 2 is of such length as to permit the said buttonhole-strip to be sprung forward sufficiently to enter a finger or thumb behind the same, if necessary, and to form a grip for the fingers which will enable the collar-button to be inserted in buttonhole 4 with ease and despatch. The slit or slot 2 may have greater or less length and be straight or otherwise, and the invention may be employed in linen and all other kinds of lay-down collars.

What I claim is—

A lay-down collar having a band and a lay-down portion overlapping the band at its outside, and the said band provided with a longitudinal slit in its rear portion forming a flexible strip below said slit and having a buttonhole at its middle, whereby engagement with the rear collar-button is effected without opening the collar.

In testimony whereof I sign this specification in the presence of two witnesses.

FREDERICK WILLIAM PARSONS.

Witnesses:
R. B. MOSER,
C. A. SELL.